United States Patent
Wang

(10) Patent No.: US 11,768,266 B2
(45) Date of Patent: Sep. 26, 2023

(54) SYSTEM AND METHOD FOR ESTIMATING THE ANGLE OF ARRIVAL USING ANTENNA ARRAYS

(71) Applicant: WiTagg, Inc., Los Altos, CA (US)

(72) Inventor: Jing Wang, Los Altos, CA (US)

(73) Assignee: WiTagg, Inc., Los Altos, CA (US)

( * ) Notice: Subject to any disclaimer, the term of this patent is extended or adjusted under 35 U.S.C. 154(b) by 243 days.

(21) Appl. No.: 17/208,949

(22) Filed: Mar. 22, 2021

(65) Prior Publication Data

US 2021/0302528 A1 Sep. 30, 2021

Related U.S. Application Data

(60) Provisional application No. 63/002,929, filed on Mar. 31, 2020.

(51) Int. Cl.
| | |
|---|---|
| G01S 5/04 | (2006.01) |
| G01S 3/04 | (2006.01) |
| G01S 3/46 | (2006.01) |
| H04W 76/10 | (2018.01) |
| H01Q 21/06 | (2006.01) |
| G01S 3/50 | (2006.01) |
| G01S 3/48 | (2006.01) |

(52) U.S. Cl.
CPC .......... *G01S 3/043* (2013.01); *G01S 3/46* (2013.01); *G01S 3/48* (2013.01); *G01S 3/50* (2013.01); *H01Q 21/06* (2013.01); *H04W 76/10* (2018.02)

(58) Field of Classification Search
CPC ... G01S 3/043; G01S 3/46; G01S 3/48; G01S 3/50; H01Q 21/06; H04W 76/10
USPC .................................... 342/417, 444, 445
See application file for complete search history.

(56) References Cited

U.S. PATENT DOCUMENTS

| | | | |
|---|---|---|---|
| 9,823,330 B2* | 11/2017 | Hart | H04W 64/006 |
| 10,481,236 B2* | 11/2019 | Simileysky | G01S 3/48 |
| 10,557,914 B2* | 2/2020 | Iizuka | G01S 3/043 |
| 10,705,176 B2* | 7/2020 | Mesecher | G01S 3/46 |
| 10,768,265 B2* | 9/2020 | Granato | G01S 3/48 |
| 10,890,644 B1* | 1/2021 | Berger | G01S 13/74 |
| 10,917,870 B2* | 2/2021 | Pan | G01S 3/48 |
| 10,972,886 B2* | 4/2021 | Simileysky | H01Q 3/24 |
| 11,513,181 B2* | 11/2022 | Hart | G01S 3/38 |
| 2014/0269389 A1* | 9/2014 | Bukkfejes | H04W 24/08 370/252 |

(Continued)

*Primary Examiner* — Chuong P Nguyen
(74) *Attorney, Agent, or Firm* — HIPP LAW

(57) ABSTRACT

Approaches are described for antenna configuration in an antenna array of limited array size and channel state information (CSI) collection and analysis, to improve accuracy of angle of arrival (AoA) estimations for localizing a client device's position. Signals can be received from groups of antennas and CSI data can be generated from the signals. The CSI data can be combined, where the combined CSI data represents CSI data measurements of multiple signals received from a plurality of antenna subsets, without requiring physical installation of additional antennas to the limited antenna array to make the CSI data measurements. The angle of arrival (AoA) of the signals is estimated based on the combined CSI, and the AoA estimation can be used to determine the client device's location, and for other location services, such as identifying a person's location, tracking and managing inventory of objects, commute prediction, and the like.

20 Claims, 11 Drawing Sheets

(56) References Cited

U.S. PATENT DOCUMENTS

2021/0385623 A1\* 12/2021 Wang ................... H04W 4/025
2022/0381868 A1\* 12/2022 Ben-Shachar ............ G01S 3/46

\* cited by examiner

SYSTEM AND METHOD FOR ESTIMATING THE ANGLE OF ARRIVAL USING ANTENNA ARRAYS

CROSS REFERENCE TO RELATED APPLICATIONS

The present application claims priority to U.S. provisional application No. 63/002,929, filed Mar. 31, 2020, and entitled "A SYSTEM AND METHOD FOR ESTIMATING THE ANGLE OF ARRIVAL USING ANTENNA ARRAYS", which is hereby incorporated herein in its entirety for all purposes.

BACKGROUND

High accuracy positioning is critical for a variety of services such as indoor navigation, public safety, asset tracking and social and digital marketing. Wireless technologies, for example, Wi-Fi, Bluetooth Low Energy (BLE) and Ultra-wideband (UWB) can be used for mobile device localization. Conventional methods involve using receiving signal strength (RSS) to calculate the distance from a mobile device to a receiver, and installing many receivers and apply trilateration algorithms to get a proximity of the location. However, RSS is not a stable measurement and can easily be affected by environments (e.g., change in environments, noise, etc.). In conventional direction finding and triangulation positioning, a radio signal from a wireless device may be intercepted, and a receiver can estimate the incoming direction (e.g., angle of arrival (AoA)) of the signal. AoA technology can be very useful for directional finding and triangulation positioning. However, the accuracy of AoA estimation requires a large antenna array size, which faces spatial limitations (e.g., installing more physical antennas in a limited space risks antenna to antenna mutual coupling problems) and expensive equipment costs. Also, interference and noise, such as from an indoor, noisy multipath environment, may distort the signals. Using distorted signals in AoA estimate algorithms known in the art (e.g., MUSIC, ESPRIT, etc.) results in miscalculated AoA estimates, and therefore unstable and inaccurate positioning results. Accordingly, it is desirable to provide improved techniques for estimating AoA that are inexpensive, do not require large numbers or sizes of antennas, and can effectively distinguish signals from noise in noisy environments.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
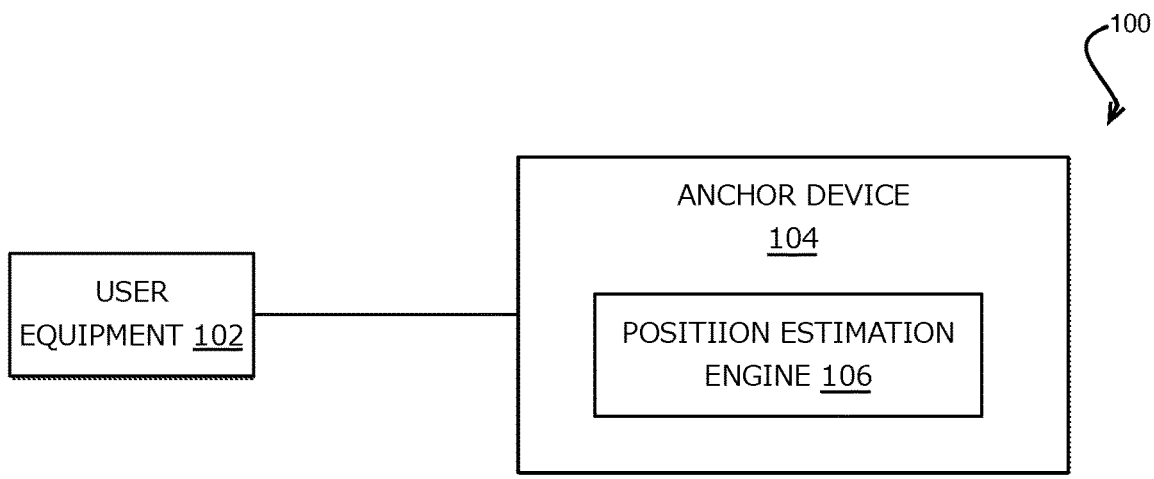
FIGS. 1A and 1B illustrate example systems that can be utilized in accordance with various embodiments.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs and in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Systems and methods in accordance with various embodiments of the present disclosure may overcome one or more of the aforementioned and other deficiencies experienced in conventional approaches for computing device localization. In particular, various embodiments describe systems and methods for configuration of an antenna array of limited array size and channel state information (CSI) collection and analysis, to improve accuracy of AoA estimations for localizing a device's position.

For example, a system with an array of multiple transmit and receive antennas (MIN/10) is provided on a device. A first subset of antennas can be selected from the array of antennas. A radio frequency (RF) switch can be used to connect the subset of antennas to a radio physical layer, so that the selected antennas can receive signals from a user device (also referred to as client device or target device). The RF switch can be controlled by a control unit or other such component or device located in the network and/or in communication with the network Channel state information (CSI) can be obtained or otherwise generated from signals received through the first antenna subset. A second subset of antennas from the array of antennas can be selected. The switch disconnects the first subset of antennas from the radio physical layer and connects the second subset of antennas to the radio physical layer, such that only the second subset of antennas can receive signals from the user device. CSI can be obtained from the signals received through the second subset of antennas. As will be described further herein, the CSI from the signals from the first antenna subset and second antenna subset can be combined to simulate CSI values collected from signals received through a large array of antennas (e.g., more antennas than physically present on the device).

Embodiments provide a variety of advantages. For example, in accordance with various embodiments, approaches for estimating the direction of a signal can be utilized by systems that attempt to cost-effectively accurately estimate the direction of a signal, including computing systems such as event planning systems, transportation systems, emergency services deployment systems, crowd management systems, public service systems, large dataset processing systems, and the like. Such systems can improve the operation and performance of the computing devices on which they are implemented by, among other advantages, efficiently managing large data sets relating to the incoming direction of signals, generating location information, reducing hardware cost and size by decreasing the number of antennas while effectively distinguishing signals from noise in noisy environments, etc. The process is improved by using computer-based techniques to optimize resource utilization of various resources (e.g., RF receivers, antennas, etc.) and processing power in real-time management of radio frequency signals, allowing for a reduction in hardware cost and size to circumvent having to use larger more expensive equipment, and circumventing the need for expensive specially designed hardware requiring more antennas, increased physical size, and complicated motorized rotating antenna arrays to achieve high accuracy in multipath environments. This lowers operation complexity on the computing system and allows for optimizing computing power, allowing for scalable analysis of larger datasets of RF signals and lower maintenance costs.

Various other functions and advantages are described and suggested below as may be provided in accordance with the various embodiments.

FIG. 1A illustrates an example system 100 in which a position estimation engine 106 may localize the position of user equipment 102 in accordance with various embodiments. User equipment 102 may include a device which emits radio frequency (RF) based wireless signals, such as WiFi, Bluetooth Low Energy (BLE), Ultra-wideband (UWB), etc. For example, user equipment 102 may be a portable computing device (e.g., a smartphone or tablet computer), a WiFi-enabled device (e.g., cameras, speakers, drones, robots, Internet of Things (IoT) device, etc.), or a device with a real time location system (RTLS) component (e.g., WiFi location tags affixed on the device, etc.), among others.

In an embodiment, a user (not shown) sends a request to anchor device 104 for the location of user equipment 102. Anchor device 104 may be a wireless anchor point including an antenna array (e.g., multiple transmit and receive antennas (MIMO)) for transmitting and/or receiving radio baseband, for example a radio chipset. In another embodiment, user equipment 102 is not connected or associated (e.g., paired, for example, via Bluetooth® connection, etc.) with anchor device 104. A radio frequency (RF) switch (not shown) in anchor device 104 may be used to connect combinations of antennas in the antenna array to receive signals from user equipment 102.

Anchor device 104 can select a first antenna subset to be active (e.g., by causing the RF switch to route signals to and from the first antenna subset). In the example, although user equipment 102 is not connected or associated with anchor device 104, anchor device 104 can initiate a handshake with user equipment 102 to establish a connection for communication between the devices. For example, anchor device 104 can detect the presence of user equipment 102 within a predetermined distance and send a plurality of control messages (e.g., 802.11 messages, such as a probe request, null data frames, etc.) to user equipment 102. The control messages may be sent periodically over short time intervals (e.g., every 200 ms, among other time intervals) to trigger user equipment 102 to respond within the time interval (e.g., after 16 ms of anchor device 104 sending the control signal). The response from user equipment 102 may include sending corresponding signals (e.g., acknowledgement (ACK) messages) back to anchor device 104, establishing a connection (e.g., handshake) between user equipment 102 and anchor device 104, and generating a CSI dataset. The first antenna subset receives the signals (first signal set), which are collected by anchor device 104. Anchor device 104 extracts corresponding CSI data from the first signal set and forwards the CSI data to position estimation engine 106. In the example, CSI data is a complex number that can include amplitude and phase data for its corresponding signal (e.g., subcarrier). Anchor device 104 forwards the CSI data from the first signal set to position estimation engine 106.

Anchor device 104 may select a second antenna subset to be active. For example, the RF switch may disconnect signal routing to and from the first antenna set, and establish signal routing to and from the second antenna set. The second antenna subset may share at least one common antenna from the first antenna subset. In another embodiment, the first and second antenna subsets may have no antennas in common. Anchor device 104 can send a second plurality of control messages to user equipment 102. User equipment 102 can respond with ACK messages in a corresponding plurality of signals (second signal set) to anchor device 104. The second antenna subset receives the second signal set, which is collected by anchor device 104. Anchor device 104 extracts corresponding CSI data from the second signal set and forwards the CSI data to position estimation engine 106. Position estimation engine 106 may combine the CSI data from the first signal set and the second signal set. Position estimation engine may use the combined CSI values to estimate the angle of arrival (AoA) of the signals from user equipment 102, to determine the position of user equipment 102. Anchor device 104 may report the position of user equipment 102 to the user.

Figure 1B:
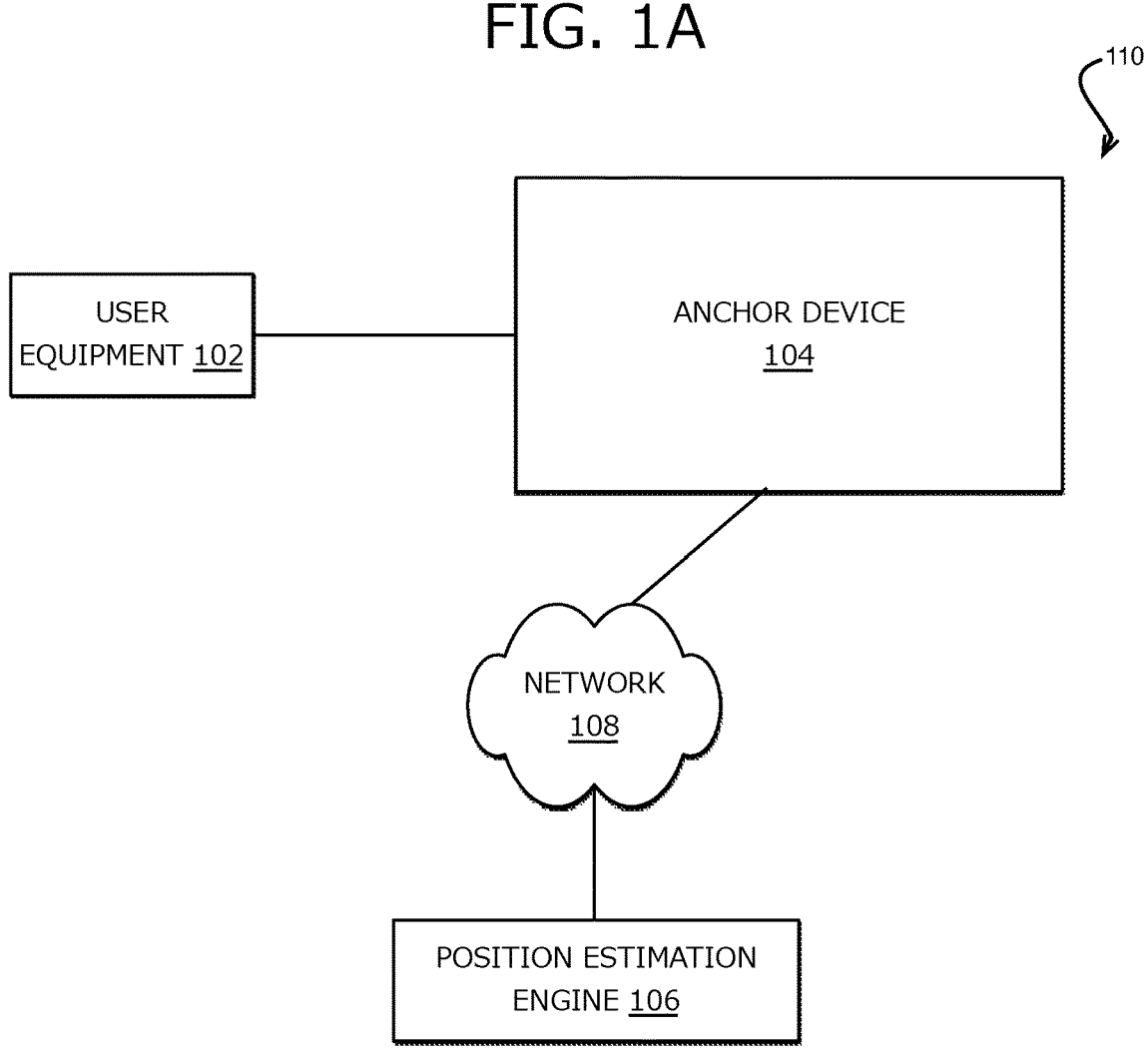

FIG. 1B illustrates another example system 110, in which the position estimation engine 106 may localize the position of user equipment 102 over a network 108 in accordance with various embodiments. As shown, position estimation engine 106 or functions performed by position estimation engine 106 can be performed over a remote network 108 by appropriate computing components. However, the location of position estimation engine 106 can be shared by being on the anchor device 104 and through remote network 108. The user may send a request to network 108 for the location of user equipment 102. Network 108 can include any appropriate network, including an intranet, the Internet, a cellular network, a local area network (LAN), or any other such network or combination, and communication over the network can be enabled via wired and/or wireless connections. Network 108 may forward the request to anchor device 104. Anchor device 104 may include an antenna array to transmit and receive signals.

User equipment 102 does not need to be connected or associated with anchor device 104. Anchor device 104 can nonetheless initiate a handshake with user equipment 102 and establish a connection for communication, by triggering user equipment 102 to emit a signal by sending a plurality of control messages to user equipment 102 periodically over short time intervals (e.g., 200 ms). User equipment 102 may respond with ACK messages in corresponding signals within the short time interval. The handshake initiates CSI data generation (e.g, CSI data is generated when the ACK message is received by anchor device 104). Anchor device 104 may cause an RF switch (not shown) to select a first subset of antennas (e.g., first antenna subset) to receive the signals (e.g., first signal set) from user equipment 102. Anchor device 104 extracts corresponding CSI data from the first signal set and forwards the CSI data to network 108. Anchor device 104 and network 108 may communicate using any appropriate communication protocol. Network 108 forwards the CSI data from the first signal set to position estimation engine 106.

Anchor device 104 may cause the RF switch to select a second antenna subset to transmit and receive signals with user equipment 102. For example, the RF switch may disconnect signal routing to and from the first antenna set, and establish signal routing to and from the second antenna set. The second antenna subset may share at least one common antenna from the first antenna subset. In another embodiment, the first and second antenna subsets may have no antennas in common. Anchor device 104 can send a second plurality of control messages to user equipment 102. User equipment 102 can respond with ACK messages in a corresponding plurality of signals (second signal set) to anchor device 104. The second antenna subset receives the second signal set, which is collected by anchor device 104. Anchor device 104 extracts corresponding CSI data from the second signal set and forwards the CSI data to network 108. Network 108 forwards the CSI data to position estimation engine 106. Position estimation engine 106 may combine the CSI data from the first signal set and the second signal set. Position estimation engine 106 may use the combined CSI values to estimate the angle of arrival (AoA) of the signals from user equipment 102, to determine the position of user equipment 102. Position estimation engine 106 may report the position of user equipment 102 to the user through network 108.

Figure 2:
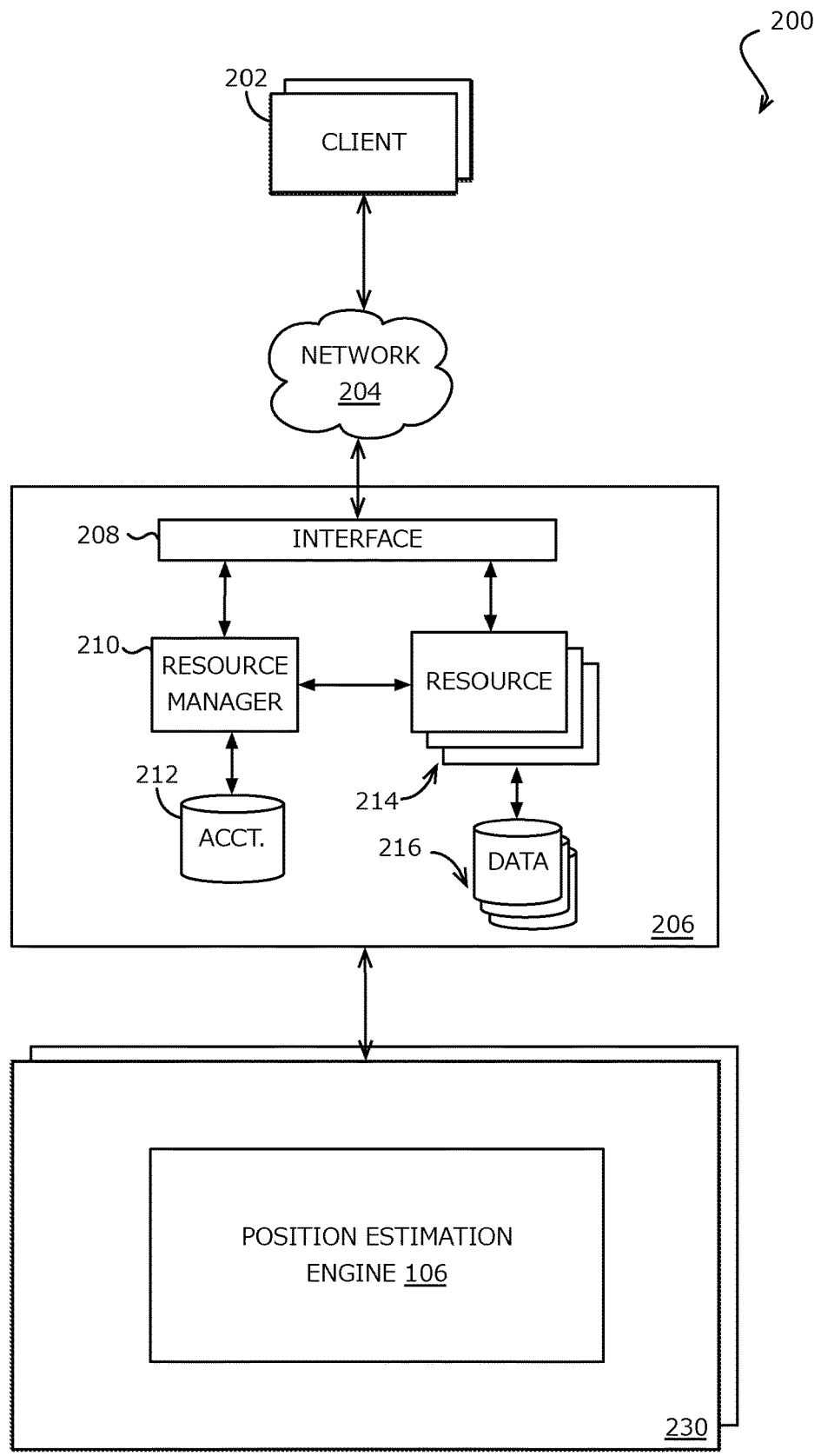
FIG. 2 illustrates an example environment in which aspects of the various embodiments can be implemented.

FIG. 2 illustrates an example environment 200 in which aspects of the various embodiments can be implemented. In this example, a user can utilize a client device 202 to communicate across at least one network 204 with a resource provider environment 206. The client device 202 can include any appropriate electronic device operable to send and receive requests or other such information over an appropriate network and convey information back to a user of the device. Examples of such client devices 202 include personal computers, tablet computers, smartphones, notebook computers, and the like. The user can include a person authorized to manage the aspects of the resource provider environment.

The resource provider environment 206 can provide location services for companies for various services. These services can include, for example, real-time location services (RTLS), global positioning system (GPS) services, indoor positioning system (IPS) services, wayfinding systems, inventory management, first responder location systems, tracking solutions, among other such services where the identifying the location of a person and/or object can be are considered. In certain embodiments, the resource provider of environment 206 can be an intermediary between a customer and localization system service. The provider can, for example, assist a company by providing location services for the company. This can include, for example, tracking and managing inventory of retail items, identifying a person's location to navigate first responders, predict commute, identify nearby businesses, etc. In various embodiments, the location and other services can be performed in hardware and software, such as by using a trained model, a person, or combination thereof.

The network(s) 204 can include any appropriate network, including an intranet, the Internet, a cellular network, a local area network (LAN), or any other such network or combination, and communication over the network can be enabled via wired and/or wireless connections.

The resource provider environment 206 can include any appropriate components for receiving customer support requests and returning information or performing actions in response to those requests. It should be noted that although the techniques described herein may be used for a wide variety of users and requests, for clarity of presentation, examples of companies responding to a location services request will be used. The techniques described herein, however, are not limited to location services requests, and responses may be provided to requests from users who are not seeking location services, and responses may be from any entity or person.

The resource provider environment 206 might include Web servers and/or application servers for localizing an object or person that can be used to, for example, track and manage inventory of items in a store, identify a person's location to direct first responders, predict commute, identify nearby institutions, and the like. While this example is discussed with respect to the internet, web services, and internet-based technology, it should be understood that aspects of the various embodiments can be used with any appropriate services available or offered over a network in an electronic environment.

In various embodiments, resource provider environment 206 may include various types of resources 214 that can be used to facilitate location services. The resources can include, for example, position estimation engine 106, application servers operable to process instructions provided by a user or database servers operable to process data stored in one or more data stores 216 in response to a user request.

Position estimation engine 106 is operable to analyze signals from a user device (also referred to as target device) to determine the location of the user device. The user device may be a device which emits RF based wireless signals (e.g., WiFi, BLE, UWB, etc.), for example, a portable computing device, smartphone, tablet computer, IoT device, devices with WiFi location tags, among others. Position estimation engine 106 may initiate a handshake with the user device to establish a connection for communication with the user device (e.g., be able to transmit and receive signals to and from the user device). A control message may be sent from position estimation engine 106 to the user device periodically at short time intervals (e.g., 200 ms or other time interval), prompting the user device to respond with a corresponding signal (e.g., ACK message) within the short time interval.

Position estimation engine 106 can communicate with a control unit to select a first antenna subset from an antenna array, and activate the first antenna subset to be able to send and receive signals to and from the user device. The antenna subset selection may be made based on, for example, a configuration file of predetermined combinations of antennas among the antenna array. The antenna array and user device may be located within a predetermined distance of each other, but do not have to be connected or associated (e.g., linked by cable, wirelessly paired, etc.) with each other.

Position estimation engine 106 collects RF signals (e.g., first signal set) received from the user device through the first antenna subset and extracts CSI data (e.g., first CSI dataset) from the first signal set. The CSI data is generated when a wireless packet from the signal is received by the antennas. The CSI data is a complex number that represents amplitude and phase information of the signal and may include other signal information, such as a timestamp indicating the signal's arrival time, signal strength, etc.

Further in the example, position estimation engine 106 communicates with the control unit to select a second antenna subset from the antenna array, and activate the second antenna subset to be able to send and receive signals to and from the user device. In certain embodiments, activate the second antenna subset or another antenna subset, deactivates a currently active subset of antennas (e.g., the first antenna subset). Position estimation engine 106 collects a second signal set received from the user device through the second antenna subset and extracts a second CSI dataset from the second signal set. Position estimation engine 106 analyzes the first and second CSI datasets. When the timestamps and signal strengths of the first and second CSI datasets are within a predetermined range of values, position estimation engine 106 combines the first and second CSI dataset into a combined CSI dataset. The combined CSI dataset may represent, for example, a CSI value that would have been extracted from a plurality of signals received through more antennas than physically present in the antenna array, thereby increasing accuracy of CSI-based AoA estimation.

The resources may be hosted on multiple server computers and/or distributed across multiple systems. Additionally, the components may be implemented using any number of different computers and/or systems. Thus, the components may be separated into multiple services and/or over multiple different systems to perform the functionality described herein. In some embodiments, at least a portion of the resources can be "virtual" resources supported by these and/or components.

In at least some embodiments, an application executing on the client device 202 that needs to access resources of the provider environment 206, for example, to initiate an instance of a location service, can submit a request that is received to interface layer 208 of the provider environment 206. The interface layer 208 can include application programming interfaces (APIs) or other exposed interfaces, enabling a user to submit requests, such as Web service requests, to the provider environment 206. Interface layer 208 in this example can also include other components as well, such as at least one Web server, routing components, load balancers, and the like.

When a request to access a resource is received at the interface layer 208 in some embodiments, information for the request can be directed to resource manager 210 or other such systems, service, or component configured to manage user accounts and information, resource provisioning and usage, and other such aspects. Resource manager 210 can perform tasks such as communicating the request to a management component or other control component which can be used to manage one or more instances of a location service as well as other information for host machines, servers, or other such computing devices or assets in a network environment, authenticate an identity of the user submitting the request, as well as to determine whether that user has an existing account with the resource provider, where the account data may be stored in at least one data store 212 in the resource provider environment 206.

For example, the request can be to instantiate a location service on host machine 230. The service (e.g., location services, positioning system services, etc.) can utilize position estimation engine 106 to identify the location of an object or person that can be used for tracking and managing inventory of items in a store, identifying a person's location to direct first responders, commute prediction, identifying nearby institutions, and the like, etc. It should be noted that although host machine 230 is shown outside the provider environment, in accordance with various embodiments, one or more modules of the trend detection service can be included in provider environment 206, while in other embodiments, some of the modules may be included in the provider environment. It should be further noted that host machine 230 can include or at least be in communication with other components, for example, a customer support session manager, etc.

Figure 3:
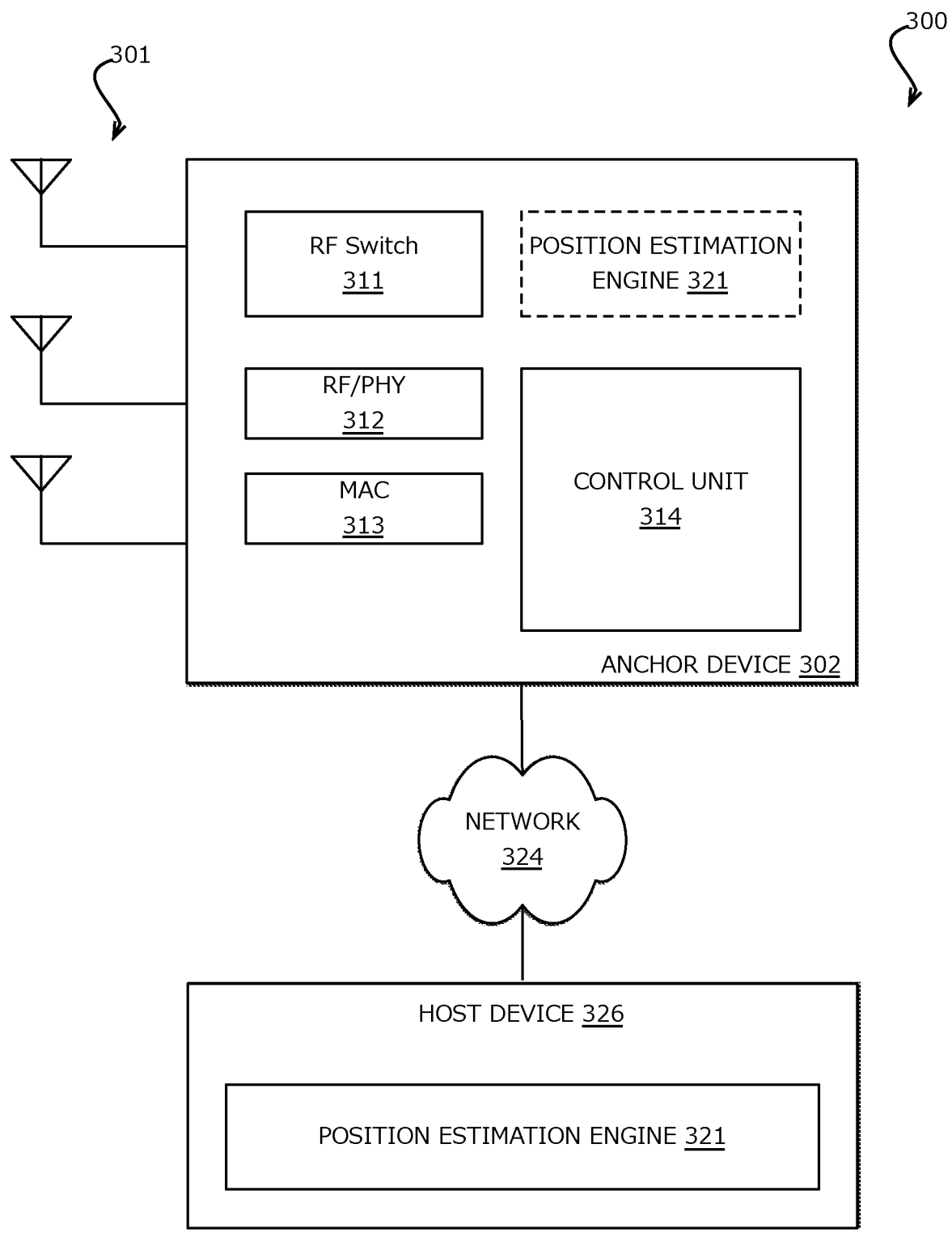
FIG. 3 illustrates an example architecture of a positioning system in accordance with various embodiments.

FIG. 3 illustrates an example architecture 300 of a positioning system in accordance with various embodiments. Anchor device 302 includes an antenna array 301, radio frequency (RF) switch 311, radio physical layer 312, MAC sublayer, control unit 314, and position estimation engine 321. Anchor device 302 may be a wireless anchor point, for example, a radio chipset. Anchor device 302 may be nearby a user device (not shown), and does not need to be connected or associated (e.g., linked by cable, wirelessly paired, have a data exchange communication connection with each other, etc.) with the user device.

As shown in the example, position estimation engine 321 may be located on the anchor device. Alternatively, position estimation engine 321 may be located remotely on a host device 326, and communicates with anchor device 302 through a network 324. In yet another example, functionality performed by position estimation engine 321 may be shared between the local anchor device 302 and remotely through host device 326 over network 324.

Antenna array 301 may include multiple transmit and receive antennas (MIMO) for transmitting and/or receiving radio baseband. In the example, antenna array 301 can transmit and receive signals to and from the user device, wherein the signals are used by position estimation engine 321 to localize the user device (e.g., by AoA estimation). Due to multipath and RF interference, increasing the number of antennas in the antenna array 301 for collecting signals from the user device will increase the accuracy and stability of the AoA estimation. However, there may be a spatial threshold on anchor device 302 for the maximum number of antennas in the antenna array 301. For example, the more antennas in the antenna array 301, the closer the antennas will be, resulting in ineffective antenna orientation, antenna to antenna mutual coupling, etc., and therefore decreasing the accuracy and stability of the AoA estimation. The spatial threshold may also be based on hardware costs of additional antennas, spatial limitations on the anchor device, etc.

RF switch 311 (e.g., antenna switch) is operable to switch between and activate different antenna subsets of antenna array 301. For example, whereas a typical WiFi radio may connect with 3 to 4 antennas (e.g., the radio has 3 or 4 RF interfaces), RF switch 311 may have one input and multiple outputs at each RF interface. For example, RF switch 311 may be a single pole four throw (SP4T) switch. Thus, for an anchor device 302 with 4 RF interfaces, a SP4T RF switch 311 may connect anchor device 302 to 16 antenna elements, creating 16 radio chains. RF switch 311 can switch between different antenna subsets by activating (switching on) different combinations of radio chains. When activating a radio chain, RF switch 311 connects the appropriate antenna element to radio physical layer 312. Radio physical layer 312 will generate CSI data for signals when the signals are received through the activated antenna subset. CSI data is a complex number that represents amplitude and phase information for each subcarrier in a channel and other signal information, such as the arrival time of the signal, signal strength, etc.

Medium access control (MAC) sublayer 313 may be connected to radio physical layer 312 (e.g., via a media-independent interface). Each the user device and anchor device 302 can be associated with identification information such as a MAC address. MAC sublayer 313 provides flow control and multiplexing for the transmission medium, and may resolve the IP address in the data packets of signals received between the user device and anchor device 302 into the MAC addresses of the devices.

Control unit 314 is operable to control activation of antenna subsets. For example, control unit 314 may receive a request for the user device's location. Control unit 314 decides when and which antenna subsets to activate to transmit and receive signals to and from the user device, based on a configuration file of predetermined combinations of antenna subjects. Control unit 314 sends switch commands to RF switch 311 to switch between radio chains accordingly (e.g., connecting the radio chains to radio physical layer 312) to activate the antenna subsets. Although user device and anchor device 302 are not connected or associated with each other, control unit 314 can sniff for wireless data packets sent by the user device. Control unit 314 may determine the MAC address of the user device by capturing and decoding the wireless frames sent by the user device. MAC sublayer 313 assigns the user device's MAC address as the destination address, and control unit 314 can send the user device an 802.11 control message (e.g., control or management messages, for example, RTS, CTS, probe request, probe response, association request, NULL or QQ SNULL data frames, etc.) through the antenna subset to the user device, to trigger user device to respond with ACK messages based on the 802.11 standard. When the user device signals (e.g., ACK messages) are received through the antenna subsets, radio physical layer 312 generates CSI data for the corresponding signals.

To combine CSI datasets (e.g., to generate a CSI dataset that would have been generated from receiving signals from more antennas than in the array), the CSI datasets from multiple signal paths (e.g., collected by multiple antenna subsets) must be within a similar timeframe and have similar signal strengths. Thus, CSI datasets need to be collected from multiple signals within a short period of time. Because the user device and anchor device 302 are not connected or associated with each other, control unit 314 cannot directly control user device to transmit signals quickly within a short period of time. However, control unit 314 can send 802.11 control messages, as described above, to trigger the user device to send responses quickly. Further, to generate enough CSI data that meet requirements for a combined CSI dataset, control unit 314 may execute multiple iterations of switching between antenna subsets and collecting user device signals from the activated antenna subsets within a short period of time. Additionally, selectively receiving user device signals from the antenna subsets as predefined in the configuration file, as opposed to collecting CSI data from every wireless data packet, improves efficiency and operational complexity of the system.

Position estimation engine 321 is operable to analyze and combine the CSI datasets and estimate the AoA of the signals from the user device to determine the user device's location. For example, position estimation engine 321 may collect CSI data from each antenna subset in antenna array 301. For each CSI dataset, position estimation engine 321 extracts the timestamp (e.g., arrival time of the signal) and signal strength. A score is assigned to the signal strength. A difference is calculated between the timestamps of the first CSI dataset (e.g., from first signal set received by first antenna subset) and the second CSI dataset (e.g., from second signal set received by second antenna subset). A difference is calculated between the signal strength scores of the first CSI dataset and the second CSI dataset. The first and second CSI datasets may be combined if their timestamps are close enough in time and if they have similar signal strengths. For example, if the timestamp difference is below a predefined threshold (such as 10-100 ms) and the signal strength score difference is within a predetermined range, then the first and second CSI datasets may be combined into a combined CSI dataset. The time threshold and signal strength score range may be defined in the configuration file. Position estimation engine 321 then estimates the AoA of the signals from the user device, using AoA estimation algorithms known in the art (e.g., MUSIC algorithm, ESPRIT algorithm, etc.), based on the combined CSI.

Figure 4:
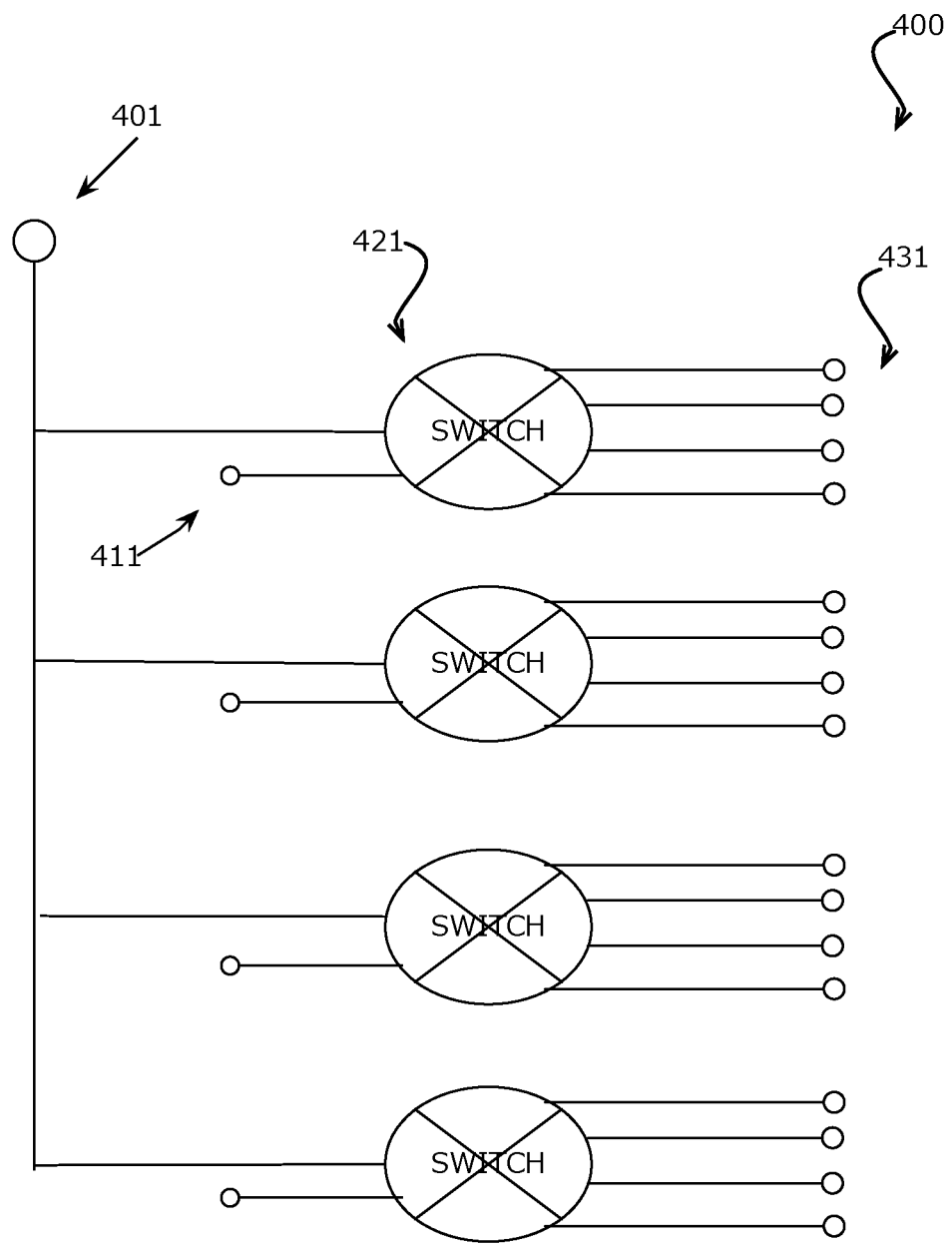
FIG. 4 illustrates an example RF switch in accordance with various embodiments.

FIG. 4 illustrates an example RF switch 400 in accordance with various embodiments. In the example, RF switch 400 is a single pole four throw (SP4T) switch, or split 4 radio frequency switch. In another embodiment, RF switch 400 may be a single pole double throw (SPDT) switch, double pole double throw (DPDT) switch, among other pole/throw configurations with multiple terminals. General purpose input/output (GPIO) control 401 may include two or more pins. In the example, GPIO control 401 can generate four or more GPIO commands, and each RF splitter 421 can generate four or more switch patterns. Switch patterns may be defined in a configuration file.

Universal File and Stream Loading (UFL) interface 411 is the UFL interface connecting to the antenna elements 431 with the radio physical layer. An antenna in a selected antenna subset is activated when RF splitter 421 switches to the appropriate antenna element 431, creating a radio RF chain (also referred to as MIMO chain) through the antenna element 431. Combining CSI data from multiple radio RF chains (e.g., through multiple antenna subsets) enables the system to increase the number of MIMO chains by several folds without adding physical chains to the array of antenna elements 431. Because CSI data from multiple signals need to be similar in arrival time and signal strength in order to be combined, RF switch 400 may switch between combinations of radio RF chains quickly in a short period of time (for example, as defined by a timeframe in the configuration file).

Figure 5A:
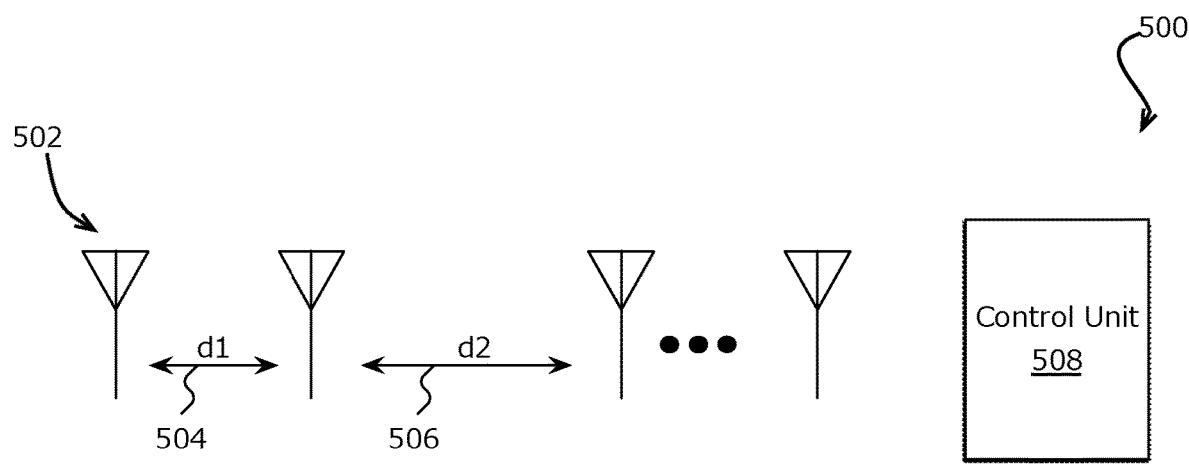
FIGS. 5A and 5B illustrate example antenna arrangements in accordance with various embodiments.

FIG. 5A illustrates an example 500 of an antenna arrangement in accordance with various embodiments. Antenna layouts may be one-dimensional (e.g., Uniform Linear Array (ULA), non-Uniform Linear Array, etc.), two-dimensional (e.g., L-shaped array, cross array, square array, octagon array, Uniform Circular Array (UCA), Concentric Circular Array (CCA), etc.), or three-dimensional (e.g., along three axes). One-dimensional layouts are limited to measuring and providing the azimuth angle of an incoming signal. Two-dimensional and third-dimensional layouts provide both azimuth and elevation angles of the incoming signals. When multiple antennas are used, conventional AoA estimation algorithms (e.g., MUSIC algorithm) require the antennas (e.g., neighboring antennas) to be equidistant (by a distance of less than half a signal wavelength, e.g., 212) from each other. In the example, antenna elements 502 are arranged in a straight line (e.g., one dimensional ULA). Any distance between antenna elements 502 must be less than half of a signal wavelength. However, antenna elements 502, including, for example, neighboring or adjacent antenna elements, may be separated by either equal distances or by variable distances such as distance 504 and distance 506. In the example, distance 506 may be greater than distance 504.

Shorter distances between antenna elements 502 result in a wider coverage angle for receiving signals. However, arranging antenna elements too close to each other may result in antenna to antenna mutual coupling problems. Larger distances between antenna elements 502 result in higher accuracy for receiving signals. However, arranging antenna elements too far apart from each other reduces the total number of antennas available, due to spatial limitations of the anchor device. Also, collecting signals from a higher number of antenna elements in an array can yield better CSI data (e.g., larger CSI matrix) that can result in more accurate AoA estimations. A higher number of antennas in an antenna array can lessen inaccurate measurements from multipath signals, such as when a radio wave signal is reflected by objects (e.g., noisy environments, when the radio wave travels indoors, etc.), and one antenna receives the signal from one path and another antenna receives the signal from a different path. Therefore, arranging antenna elements at variable distances, such as distance 504 and distance 506, allows for flexibility in antenna layout (e.g., ULA, 2D, or 3D arrays) when the total length of the array is restricted, and allows for control unit 508 to select between antenna subsets that can yield wider coverage and antenna subsets that can receive signals with higher accuracy.

Figure 5B:
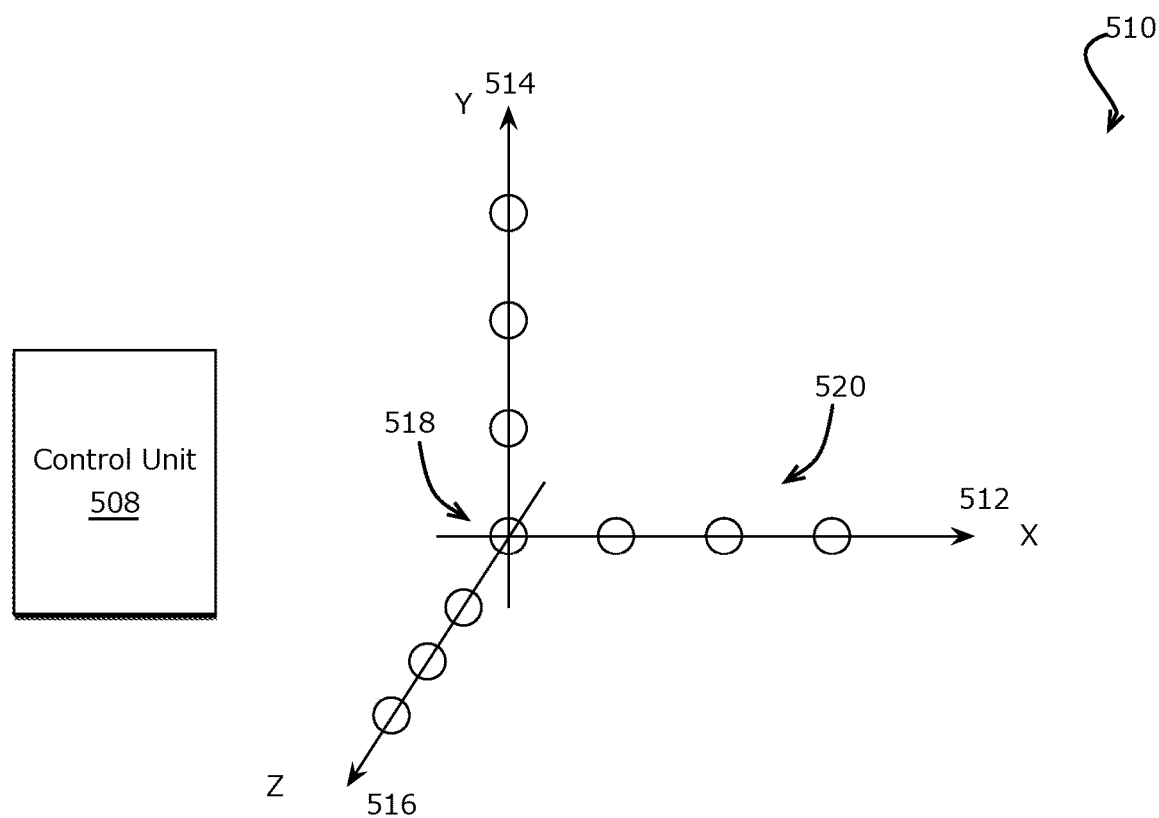

FIG. 5B illustrates another example 510 of an antenna arrangement in accordance with various embodiments. In the example, antenna elements 520 are arranged in a three-dimensional layout, along x-axis 512, y-axis 514, and z-axis 516. Each axis 512, 514, and 516 can have a linear antenna array (e.g., two or more antennas aligned in a straight line) lie along its direction, resulting in a three-dimensional multi-array. The distance between each antenna element is less than half of a signal wavelength, and may be equidistant or of variable distances. Control unit 508 may select different antenna subsets to activate and receive signals. In an embodiment, a plurality of antenna subsets may share a common antenna. For example, control unit 508 may activate a first antenna subset containing the antenna array along x-axis 512, and a second antenna subset containing the antenna array along z-axis 516. The first and second antenna subsets share a common antenna element 518. Sharing of a common antenna element between multi-arrays results in reducing the size of each of the three antenna arrays (e.g., when total length of the array is spatially restricted).

Figure 6:
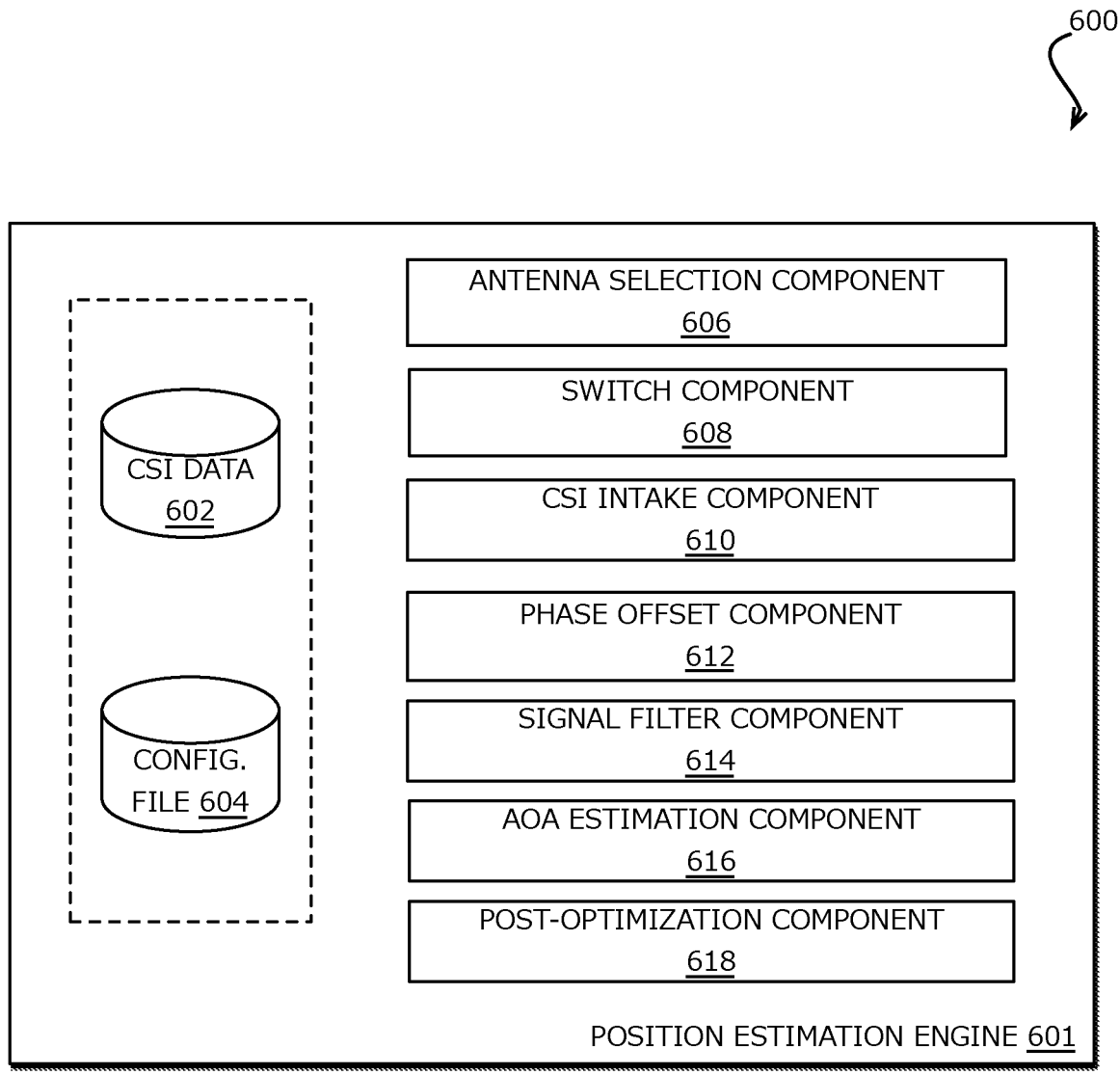
FIG. 6 illustrates example components for estimating a user's position in accordance with various embodiments.

FIG. 6 illustrates example 600 of position estimation engine 601 in accordance with an embodiment. Position estimation engine 601 includes antenna selection component 606, switch component 608, CSI intake component 610, phase offset component 612, signal filter component 614, AoA estimation component 616, and post-optimization component 618. In this example, position estimation engine 601 may localize the position of a user device (also referred to as client device or target device. For example, the user device may be WiFi-enabled object such as an IoT device, a personal computing device such as smartphone or tablet computer on a person, among others. The user device may transmit RF-based wireless signals, such as Wifi, BLE, UWB, etc. The CSI data extracted from the received signals is analyzed by position estimation engine 601 to determine direction of the signal (e.g., angle of arrival (AoA) estimation) to localize the position of the user device.

Antenna selection component 606 is operable to select antenna subsets from an antenna array for transmitting and receiving signals to and from the user device. In this example, configuration file 604 may include predetermined combinations of antennas and sequences of antenna switch patterns (e.g., antenna subset sequences). Configuration file 604 may also include user-defined antenna subsets and antenna subset sequences. The antenna subset sequences may include, for example, how long an antenna subset may be activated before switching to the next antenna subset (e.g., a switch schedule), the angle or orientation of antennas in each antenna subset, etc. Antenna selection component 606 controls switch component 608 to execute the antenna subset sequences and switch between antenna subsets according to the switch schedule.

Switch component 608 is operable to switch between and activate different antenna subsets of antenna array. Whereas a typical WiFi radio may connect with 3 to 4 antennas (e.g., the radio has 3 or 4 RF interfaces), switch component 608 may include one input and multiple outputs at each RF interface. For example, switch component 608 may be a single pole four throw (SP4T) switch. Thus, for a WiFi radio with 4 RF interfaces, a SP4T RF switch may connect the WiFi radio to 16 antenna elements, creating 16 radio chains. In another embodiment, switch component 608 may include a single pole double throw (SPDT) switch, double pole double throw (DPDT) switch, among other pole/throw configurations with multiple terminals. Switch component 608 can switch between different antenna subsets by activating (switching on) different combinations of radio chains. When activating a radio chain, switch component 608 connects the appropriate antenna element to radio physical layer. The radio physical layer can generate CSI data for signals when the signals are received through the activated antenna subset.

CSI intake component 610 is operable to extract CSI data from the signals received from the user device. CSI data is a complex number that represents amplitude and phase information for each subcarrier in a channel and other signal information, such as the arrival time of the signal, signal strength, etc. In this example, CSI intake component 610 converts channel measurements collected from the received signals into a complex number based on phase and amplitude (i.e., a+bj) for each subcarrier. CSI intake component 610 also extracts the timestamp (e.g., arrival time of the signal) and signal strength of the received signals. CSI intake component 610 assigns a score to each signal strength. Extracted CSI data, timestamp, signal strength score, and other extracted signal information is stored in CSI data store 602. CSI data is used in direction finding algorithms (e.g., MUSIC, ESPRIT, etc.) to estimate the AoA of the signals from the user device to determine its location. Collecting signals from a larger antenna array size (e.g., high number of antenna elements in an antenna array) can yield better CSI data (e.g., larger CSI matrix) that can result in more accurate AoA estimations. Because the antenna array size is spatially limited, CSI data extracted from multiple signals through a plurality of antenna subsets may be combined to simulate a larger CSI matrix.

To combine CSI datasets (e.g., to generate a CSI dataset that would have been generated from receiving signals from more antennas than in the array), the CSI datasets from multiple signal paths (e.g., collected by multiple antenna subsets) must be similar in arrival time and signal strength. Thus, CSI intake component 610 collects CSI datasets from multiple signals within a short period of time. Combining CSI data from multiple radio RF chains (e.g., through multiple antenna subsets) enables the system to increase the number of MIMO chains in the CSI matrix by several folds without adding physical chains to the antenna array.

Phase offset component 612 and signal filter component 614 are operable to sanitize the CSI data. Internal phase offset may occur in each antenna element, for example, due to properties of the antenna materials, etc. Phase offset component 612 may sanitize the phase data by removing phase offset from the CSI data. Some measurements of the signals received through the radio chains may include inaccuracies, loss of integrity of the data, may be corrupted by noise, etc. Signal filter component 614 may remove from CSI data store 602 any CSI data with poor signal measurements collected from the radio chains.

AoA estimation component 616 is operable to analyze and combine the CSI data to estimate the AoA of the signals from the user device. In the example, AoA estimation component 616 may receive the CSI data as input. A CSI data set is a N*M complex number matrix, where N is the number of MIMO chains (e.g., antennas), and M is the number of subcarriers a radio chip (e.g., WiFi radio) can measure. The CSI matrix may be represented as equation (1):

$$CSI_{matrix} = \begin{pmatrix} c_{1,1} & \cdots & c_{1,m} \\ \vdots & \ddots & \vdots \\ c_{n,1} & \cdots & c_{n,m} \end{pmatrix} \quad (1)$$

Larger values for N indicate that more sensors (e.g., antennas) are used to receive signals from the user device, resulting in higher accuracy of the AoA estimation. AoA estimation component 616 simulates a CSI matrix with larger N and M values by combining a plurality of similar CSI data into a single (combined) CSI dataset. In the example, AoA estimation component 616 may calculate the difference between timestamp and the difference between the signal strength scores of a first CSI dataset and second CSI dataset. The first and second CSI datasets may be combined if their timestamps are close enough in time and if they have similar signal strengths. For example, if the timestamp difference is below a predefined threshold (e.g., 10-100 ms) and the signal strength score difference is within a predetermined range, then the first and second CSI datasets may be combined into a combined CSI dataset. The time threshold and signal strength score range may be defined in the configuration file 604. AoA estimation component 616 may further use phase realignment to adjust phase values for each subcarrier, such that the phase data can be considered as part of one CSI dataset. Thus, combining k number of CSI datasets results in a matrix with (k×N) rows, as represented in equation (2):

$$CSI_{tm} = \begin{pmatrix} c_{1,1} & \cdots & c_{1,m} \\ \vdots & \ddots & \vdots \\ c_{k*n,1} & \cdots & c_{k*n,m} \end{pmatrix} \quad (2)$$

AoA estimation component 616 may remove noise, such as damaged data from the CSI matrix (e.g., reflection and movement of a mobile device may corrupt or distort CSI data), and rebuild the CSI matrix. For example, AoA estimation component 616 can remove subcarriers from the combined CSI dataset and rebuild the CSI matrix X (e.g., with the damaged data columns removed from the matrix), as represented in equation (3):

$$X = \begin{pmatrix} c_{1,1} & \cdots & c_{1,m'} \\ \vdots & \ddots & \vdots \\ c_{t*n,1} & \cdots & c_{t*n,m'} \end{pmatrix} \quad (3)$$

X's covariance matrix $R_x$ is calculated, where $X^H$ is the conjugate transpose matrix of X, as represented in equation (4):

$$R_x = [XX^H] \quad (4)$$

Eigenvectors of $R_x$ are calculated, and a noise threshold is used to construct a noise matrix $E_n$ whose columns are eigenvectors of $R_x$ corresponding to eigenvalues smaller than the noise threshold. The spectrum function $P_{mu}$ is calculated, and the estimated AOA is obtained by searching the peak, as represented in equation (5):

$$P_{mu}(\theta) = \frac{1}{\alpha^H(\theta)E_n E_n^H \alpha(\theta)} \quad (5)$$

Post-optimization component 618 is operable to further filter out outliers from the AoA estimation, based on user-defined criteria. For example, post-optimization component 618 may utilize statistics algorithms (e.g., mean, average, moving window average, etc.), or filtering algorithms (e.g., low-pass filter, Kalman filter, extended Kalman filter, particle filter etc.), among others, to remove outliers, and smoothen the results of the AoA estimation. Post-optimization component 618 can incorporate the AoA estimation with data from other sensors (e.g., accelerometer, gyroscope, camera, LiDAR, etc.). For example, an accelerometer can obtain sensor motion data of the user device to estimate the movement of the user device, and a corresponding cutoff frequency may be applied for the lowpass filter that was used in the AOA post-optimization process.

Figure 7:
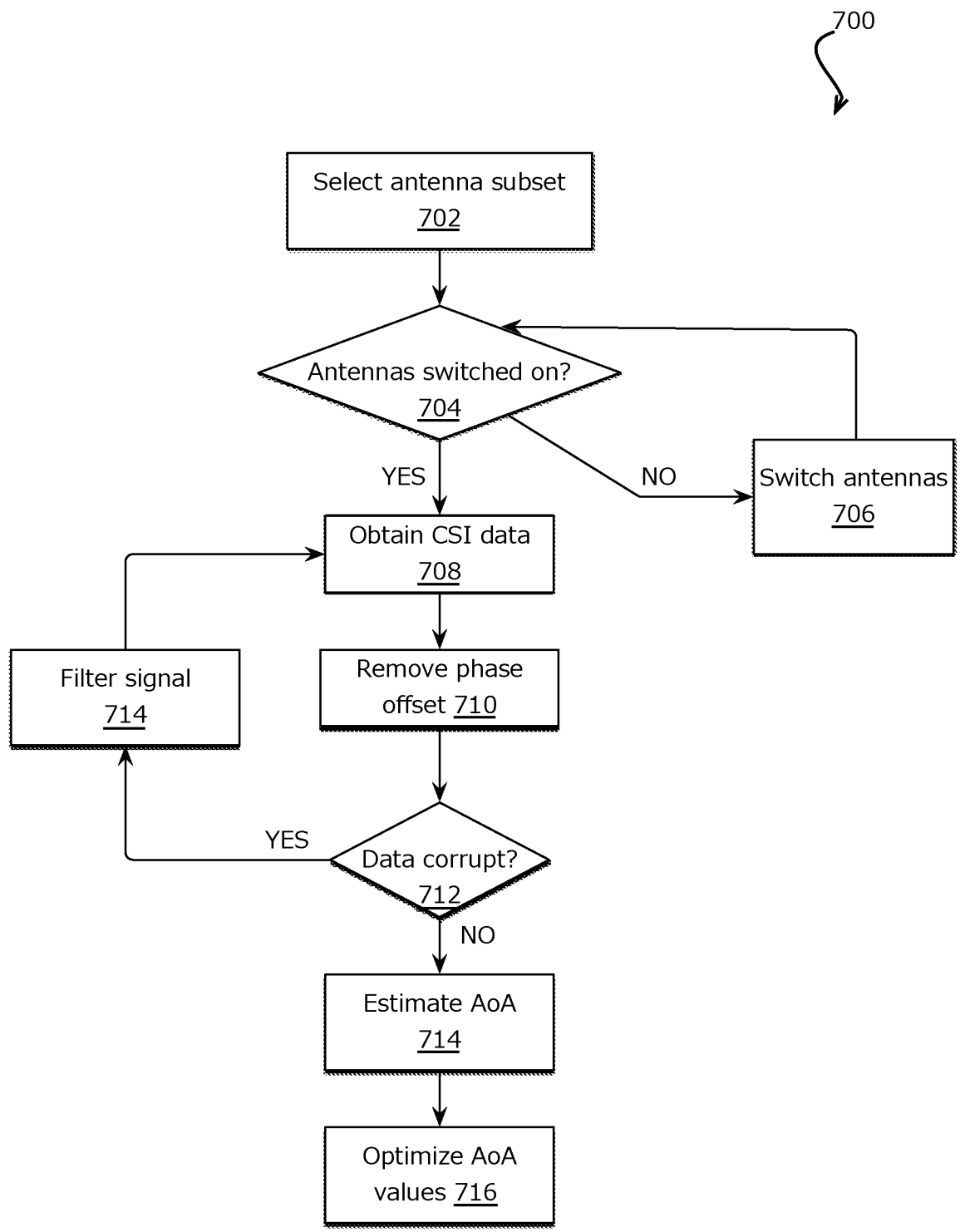
FIG. 7 illustrates an example process for determining a user's position in accordance with various embodiments.

FIG. 7 illustrates an example process 700 for estimating the AoA of signals from a user (also referred to as user device or client device) to determine the user's position in accordance with various embodiments. It should be understood that, for any process described herein, that there can be additional or fewer steps performed in similar or alternative orders, or in parallel, within the scope of the various embodiments unless otherwise stated. In this example, a first subset of antennas can be selected 702 from an array of multiple transmit and receive antennas (MIMO), to transmit and receive signals to and from the user device. The selection may be made based on predetermined combinations of antennas based on for example, position of the antenna, orientation of the antenna, distance between antennas, preferences for accuracy or wider coverage of signal measurements, among others. For example, in the situation where wider coverage for receiving signals is preferred, an antenna subset may include antennas that are closer to each other in distance (while maximum distance is less than half of a signal wavelength). In the situation where higher measurement accuracy is preferred, another antenna subset may include antennas that are farther apart (also while maximum distance is less than half of a signal wavelength), for example, to avoid antenna to antenna mutual coupling).

The process determines 704 whether the antennas in the selected antenna subset are activated. A radio frequency (RF) switch can be used to connect the subset of antennas to a radio physical layer, so that only the selected antennas can receive signals from the user device. For example, the RF switch may include a SP4T switch, or other pole/throw configurations with multiple terminals The RF switch may switch 706 between different antenna subsets by activating (switching on) different combinations of radio chains. The switching 706 may be made according to a preconfigured schedule of sequences (e.g., sequences of antenna switch patterns, and how long an antenna subset may be activated before switching to the next antenna subset).

In the example, the radio physical layer can generate CSI data for signals when the signals are received through the activated antenna subset. CSI data is a complex number that represents amplitude and phase information for each subcarrier in a channel and other signal information, such as the arrival time of the signal, signal strength, etc. The CSI data is collected 708, including the timestamp (e.g., arrival time of the signal) and signal strength of the received signals. A score is assigned to each signal strength. Phase data is sanitized by removing 710 phase offset from the CSI data that may occur, for example, due to properties of the antenna materials, etc. The process identifies 712 whether a CSI dataset includes corrupt data. For example, CSI data may be distorted due to reflection and movement of the user device during signal transmission. The signal may be filtered 714 by removing any distorted CSI data.

The cleaned CSI data is collected and analyzed to estimate 714 the AoA of the signal. The difference between the timestamp of a first CSI dataset and second CSI dataset is calculated. The difference between the signal strength scores of the first CSI dataset and second CSI dataset is also calculated. The first and second CSI datasets may be combined if their timestamps are close enough in time and if they have similar signal strengths. For example, signals may be combined if they have the same or similar background noise, the signal transmitter (e.g., user device) has not moved or changed direction or orientation, and there has been no change in the surrounding environment of the signals. In an example, a timestamp difference below a time threshold (e.g., 10-100 ms) may indicate the signals from the two datasets arrived close in time together. The time threshold may be an adaptive value. For example, in the situation where the user device is moving quickly, or is in an environment with many fast-moving objects (e.g., increased chance of changes in the surrounding environment between the time window), the time threshold may be decreased to a smaller value.

Using an AoA estimation algorithm (e.g., MUSIC), it is assumed in the presence of Gaussian white noise, the noise is highly unrelated to the signal. The noise and signal will be orthogonal to each other, when the steering vector matrix has the correct list of steering angles (AOA). Since the noise is constantly changing due to the changes in the surrounding environment, the noise is a snapshot capture of the environment at any given time.

A signal strength score difference within a predetermined range may indicate that the signals from the two datasets have similar background noise. In the situation where a signal strength score difference falls below or above the predetermined range, the surrounding environment of the signals may have experienced change (e.g., the background noise for each signal is different) and the CSI datasets therefore cannot be treated as from the same noise subspace. Phase values for each subcarrier may also be adjusted (e.g., by phase realignment), such that the phase data of the signals can be considered as part of one CSI dataset. The time threshold and predetermine range for signal strength score difference may be predefined in a configuration file, or manually set by a user.

Thus, the first and second CSI datasets may be combined when the timestamp difference is below the time threshold and when the signal strength score difference falls within the predetermined range. The combined CSI is then used in AoA estimation algorithms known in the art (e.g., MUSIC algorithm, ESPRIT algorithm, etc.) to determine the direction of the signals and localize the user device.

The estimated AoA values are optimized 716. For example, bad CSI readings (e.g., data distorted due to reflection and movement of the user device during signal transmission) may be removed from the combined CSI, and an updated combined CSI is recalculated (e.g., rebuild the CSI matrix with the subcarrier of the distorted CSI dataset removed).

Figure 8:
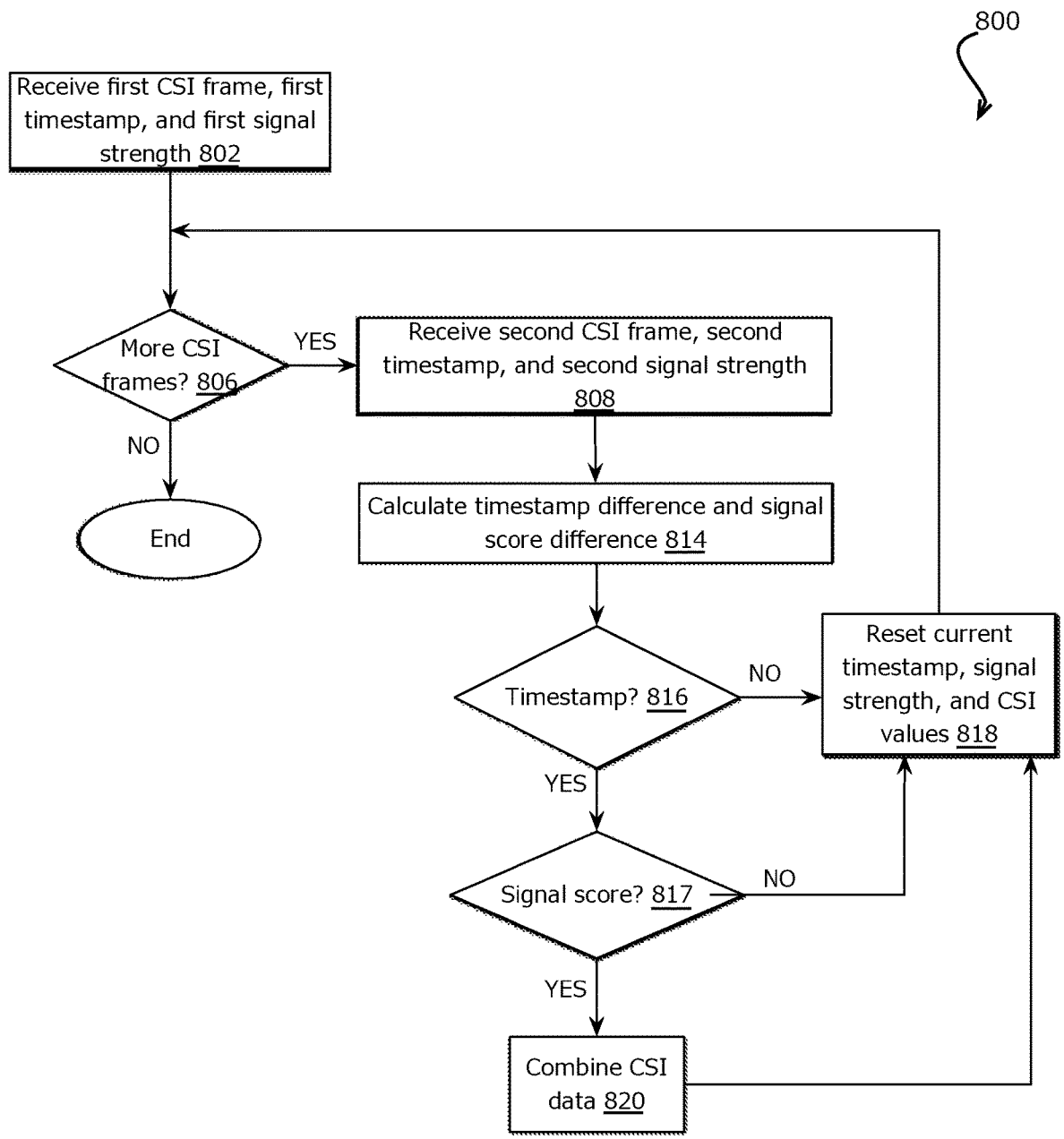
FIG. 8 illustrates an example process for combining CSI data in accordance with various embodiments.

FIG. 8 illustrates an example process 800 for combining CSI data in accordance with various embodiments. In the example, a first CSI frame (also referred to as a first CSI dataset), first timestamp ($T_1$), and first signal strength of a signal is received 802 from a user device. CSI data is a complex number that represents amplitude and phase information for each subcarrier in a channel and other signal information, such as the arrival time of the signal, signal strength, etc. The first CSI dataset may be received through a first antenna subset of an antenna array. A signal strength score is assigned to the first signal strength ($S_1$).

The process checks 806 whether more CSI frames are available from additional signals from the user device. A second CSI frame, second timestamp ($T_n$), and second signal strength of a second signal is received 808. The second CSI dataset may be received from a second antenna subset of the antenna array (e.g., a different combination of antenna elements from the first antenna subset). A second signal strength score is assigned to the second signal strength ($S_n$). The process calculates 814 a timestamp difference ($T_n-T_1$) between the first ($T_1$) and second timestamp, and a signal strength score difference ($S_n-S_1$) between the first ($S_1$) and second signal strength scores ($S_n$).

The timestamp difference ($T_n-T_1$) between the two datasets is compared 816 against a time threshold ($T_A$). The first and second CSI datasets may be combined if their timestamps are close enough in time and if they have similar signal strengths. For example, signals may be combined if they have the same or similar background noise, the signal transmitter (e.g., user device) has not moved or changed direction or orientation, and there has been no change in the surrounding environment of the signals. In an example, a timestamp difference ($T_n-T_1$) below a time threshold ($T_A$) (e.g., 10-100 ms) may indicate the signals from the two datasets arrived close in time together. Time threshold ($T_A$) may be a variable value. For example, in the situation where the user device is moving quickly, or is in an environment with many fast-moving objects (e.g., increase chance of reflected or multipath signals), the time threshold ($T_A$) may be decreased to a smaller value.

The signal strength score difference ($S_n-S_1$) is compared 817 against a predetermined signal strength score range ($S_{min},S_{max}$). A signal strength score difference ($S_n-S_1$) within a predetermined range ($S_{min},S_{max}$) may indicate that the signals from the two datasets have similar background noise. In the situation where a signal strength score difference ($S_n-S_1$) falls below the range minimum ($S_{min}$), or above the range maximum ($S_{max}$), the surrounding environment of the signals may have experienced change, and the signals therefore cannot be treated as coming from a single dataset. Phase values for each subcarrier may also be adjusted (e.g., by phase realignment), such that the phase data of the signals can be considered as part of one CSI dataset. The time threshold ($T_{threshold}$) and predetermine range ($S_{min},S_{max}$) for signal strength score difference may be predefined in a configuration file, or manually set by a user.

In the situation where the timestamp difference is below the time threshold (e.g., $|T_n-T_1|<T_A$), and the signal strength score difference falls within the predetermined range (e.g., $S_{min} \leq |S_n-S_1| \leq S_{max}$), the first and second CSI datasets may be combined 820. The combined CSI is then used in AoA estimation algorithms known in the art (e.g., MUSIC algorithm, ESPRIT algorithm, etc.) to determine the direction of the signals and localize the user device.

Once the first and second CSI datasets are combined, the timestamp of the combined CSI dataset is updated 818 to the timestamp of the second (e.g., most recently received) CSI dataset ($T_n$). The signal strength score of the combined CSI dataset is also updated 818 to the signal strength score of the second (e.g., most recently received) CSI dataset ($S_n$). The process is iterated 806 for subsequent CSI frames.

Figure 9:
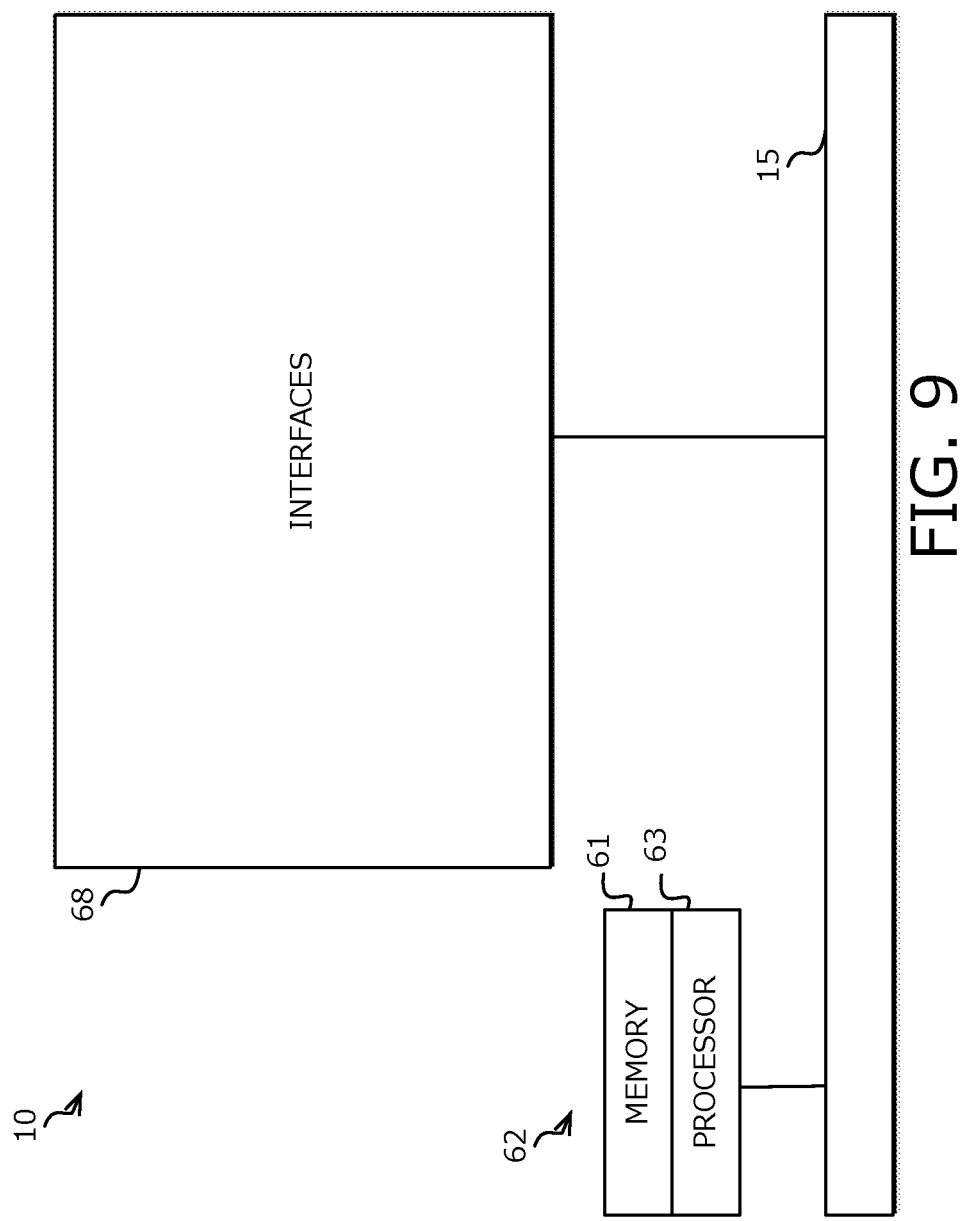
FIG. 9 illustrates an exemplary access device that can be utilized in accordance with various embodiments.

FIG. 9 illustrates an example of an exemplary network device 10, such as a cable modem, that can be utilized in accordance with various embodiments. Network device 10 includes a master central processing unit (CPU) 62, interfaces 68, and a bus 15 (e.g., a PCI bus). When acting under the control of appropriate software or firmware, the CPU 62 is responsible for numerous tasks, at least some of which relate to network management. It preferably accomplishes all these functions under the control of software including an operating system and any appropriate applications software. CPU 62 may include one or more processors 63. In an alternative embodiment, processor 63 is specially designed hardware for controlling the operations of network device 10. In a specific embodiment, a memory 61 (such as non-volatile RAM and/or ROM) also forms part of CPU 62. However, there are many different ways in which memory could be coupled to the system.

The interfaces 68 are typically provided as interface cards (sometimes referred to as "line cards"). Generally, they control the sending and receiving of data packets over the network and sometimes support other peripherals used with network device 10. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communication's intensive tasks, these interfaces allow CPU 62 to efficiently perform routing computations, network diagnostics, security functions, etc.

Although the system shown in FIG. 9 is one specific network device of the present invention, it is by no means the only network device architecture on which the present invention can be implemented. For example, an architecture having a single processor that handles communications as well as routing computations etc. is often used. Further, other types of interfaces and media could also be used with the router.

Regardless of the network device's configuration, it may employ one or more memories, or memory modules (including memory 61) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 10:
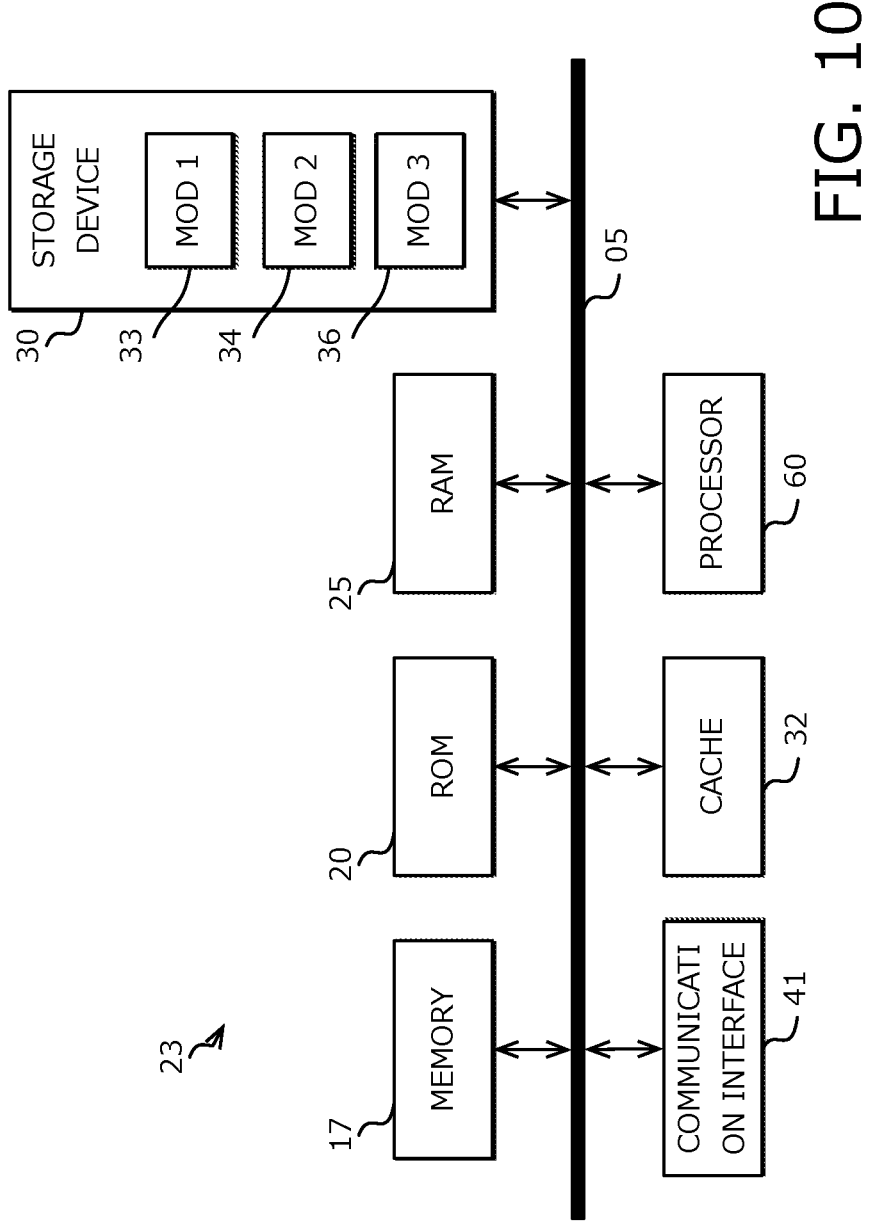
FIG. 10 illustrates example components of an access device, such as the access device illustrated in FIG. 9.

FIG. 10 illustrates an example of exemplary possible system embodiments, such a system making up network device 10 of FIG. 9. The more appropriate embodiment will be apparent to those of ordinary skill in the art when practicing the present technology. Persons of ordinary skill in the art will also readily appreciate that other system embodiments are possible. FIG. 10 illustrates exemplary system 23 wherein the components of the system are in electrical communication with each other using a bus 05.

Exemplary system 23 includes a processing unit (CPU or processor) 60 and a system bus 05 that couples various system components including the system memory 17, such as read-only memory (ROM) 20 and random-access memory (RAM) 25, to the processor 60. The system 23 can include a cache of high-speed memory connected directly with, in close proximity to, or integrated as part of the processor 60. The system 23 can copy data from the memory 17 and/or the storage device 30 to the cache 32 for quick access by the processor 60. In this way, the cache can provide a performance boost that avoids processor 60 delays while waiting for data. These and other modules can control or be configured to control the processor 60 to perform various actions. Other system memory 17 may be available for use as well. The memory 17 can include multiple different types of memory with different performance characteristics. The processor 60 can include any general-purpose processor and a hardware module or software module, such as module 1 33, module 2 34, and module 3 36 stored in storage device 30, configured to control the processor 60 as well as a special-purpose processor where software instructions are incorporated into the actual processor design. The processor 60 may essentially be a completely self-contained computing system, containing multiple cores or processors, a bus, memory controller, cache, etc. A multi-core processor may be symmetric or asymmetric. The processor can be implemented with one or more virtual processors, as well as any combination of CPUs and virtual processors.

The communications interface 41 can generally govern and manage the user input and system output. There is no restriction on operating on any particular hardware arrangement, and therefore the basic features here may easily be substituted for improved hardware or firmware arrangements as they are developed.

Storage device 30 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 25, read-only memory (ROM) 20, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or another intangible medium to facilitate communication of such instructions. Transmission media includes coaxial cables, copper wire, and fiber optics, including wires that comprise bus 05 for transmitting a computer data signal.

The storage device 30 can include software modules 33, 34, 36 for controlling the processor 60. Other hardware or software modules are contemplated. The storage device 30 can be connected to the system bus 05. In one aspect, a hardware module that performs a particular function can include the software component stored in a computer-readable medium in connection with the necessary hardware components, such as the processor 60, bus 05, and so forth, to carry out the function.

Figure 11:
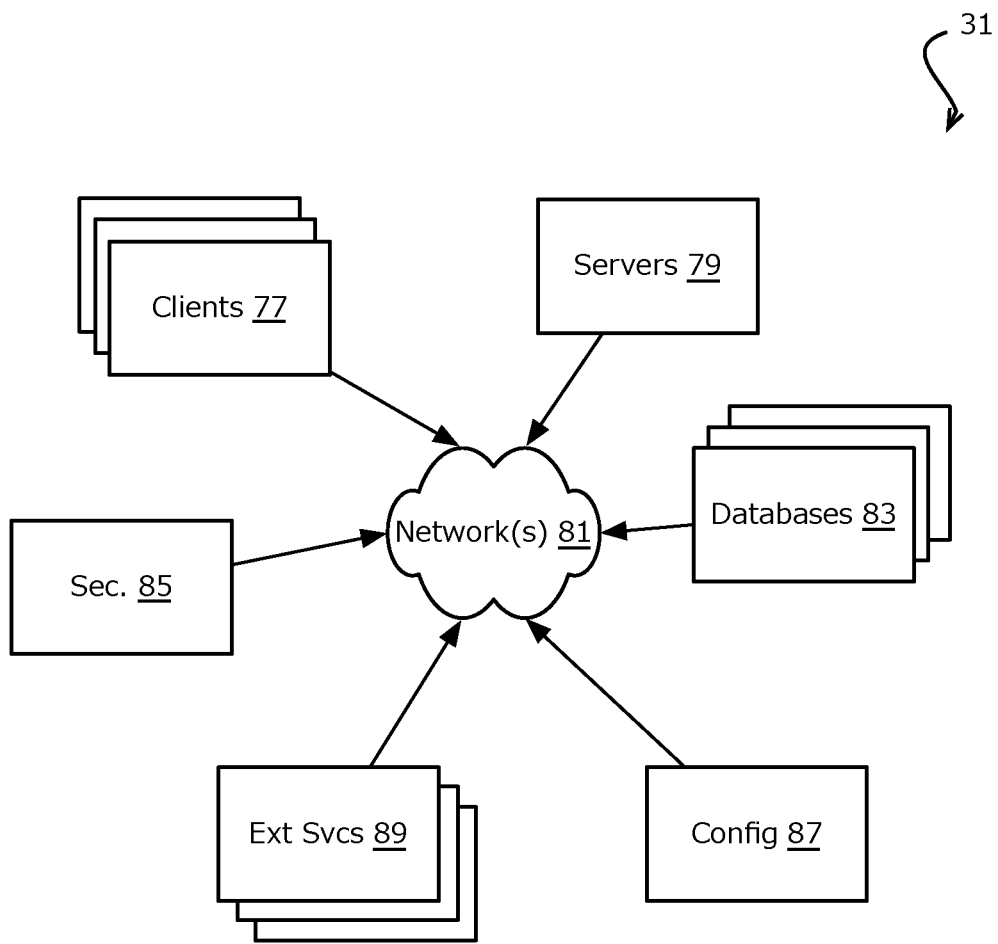
FIG. 11 illustrates an exemplary architecture of a system that can be utilized in accordance with various embodiments.

In some embodiments, systems may be implemented on a distributed computing network, such as one having any number of clients and/or servers. Referring now to FIG. 11, there is shown a block diagram depicting an exemplary architecture 31 for implementing at least a portion of a system according to one aspect on a distributed computing network. According to the aspect, any number of clients 77 may be provided. Each client 77 may run software for implementing client-side portions of a system. In addition, any number of servers 79 may be provided for handling requests received from one or more clients 77. Clients 77 and servers 79 may communicate with one another via one or more electronic networks 81, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 81 may be implemented using any known network protocols, including for example wired and/or wireless protocols.

In addition, in some embodiments, servers 79 may call external services 89 when needed to obtain additional information, or to refer to additional data concerning a particular call. Communications with external services 89 may take place, for example, via one or more networks 81. In various embodiments, external services 89 may comprise web-enabled services or functionality related to or installed on the hardware device itself. For example, in one aspect where client applications are implemented on a smartphone or other electronic device, client applications may obtain information stored in servers 79 in the cloud or on an external service 89 deployed on one or more of a particular enterprise's or user's premises.

In some embodiments, clients 77 or servers 79 (or both) may make use of one or more specialized services or appliances that may be deployed locally or remotely across one or more networks 81. For example, one or more databases 83 may be used or referred to by one or more embodiments. It should be understood by one having ordinary skill in the art that databases 83 may be arranged in a wide variety of architectures and using a wide variety of data access and manipulation means. For example, in various embodiments one or more databases 83 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 85 and configuration systems 87. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security system 85 or configuration system 87 or approach is specifically required by the description of any specific aspect.

For clarity of explanation, in some instances, the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. In some examples, hard-wired circuitry may be used in place of or in combination with software instructions for implementation. Portions of computer resources used can be accessible over a network. The computer-executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smartphones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments can be implemented in a wide variety of operating environments, which in some cases can include one or more user electronic devices, integrated circuits, chips, and computing devices—each with the proper configuration of hardware, software, and/or firmware as presently disclosed. Such a system can also include a number of the above exemplary systems working together to perform the same function disclosed herein—to filter tones from a mixed signal using novel integrated circuits in a communications network.

Most embodiments utilize at least one communications network that would be familiar to those skilled in the art for supporting communications using any of a variety of commercially available protocols, such as TCP/IP, FTP, UPnP, NFS, and CIFS. The communications network can be, for example, a cable network, a local area network, a wide-area network, a virtual private network, the Internet, an intranet, an extranet, a public switched telephone network, an infrared network, a wireless network and any combination thereof.

The environment can include a variety of data stores and other memory and storage media as discussed above—including at least a buffer. These storage components can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used, and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   an antenna array comprising a plurality of antennas, individual antennas positioned a distance from neighboring antennas;
   a computing device processor; and
   a memory device including instructions that, when executed by the computing device processor, enables the computing system to:
      detect a client device;
      obtain a response to a control message from the client device within a time interval;
      establish a communication session between the computing device processor and the client device;
      obtain an antenna configuration file, the antenna configuration file operable to control a selection of at least one antenna of the plurality of antennas;
      activate a first subset of antennas of the plurality of antennas based on the antenna configuration file;
      obtain a first RF signal by the first subset of antennas;
      analyze the first RF signal to generate a first channel state information dataset, a first timestamp, and a first signal strength;
      activate a second subset of antennas of the plurality of antennas based on the antenna configuration file, wherein activating the second subset of antennas deactivates the first subset of antennas;
      obtain a second RF signal by the second subset of antennas;
      analyze the second RF signal to generate a second channel state information dataset, a second timestamp, and a second signal strength;
      determine a time difference between the first timestamp and the second timestamp is within a period of time;
      determine a signal strength difference between the first signal strength and the second signal strength is within a signal strength range;
      combine the first channel state information dataset and the second channel state information dataset to create a combined channel state information dataset; and
      determine an angle of arrival of the first RF signal and the second RF signal based on the combined channel state information dataset.

2. The computing system of claim 1, wherein the control message is one of an 802.11 control message and 802.11 null data frame; and
   the client device is capable of receiving and transmitting 802.11 messages within the time interval.

3. The computing system of claim 1, wherein the instructions, when executed by the computing device processor, further enables the computing system to:
   for a plurality of channel state information datasets, identify at least one channel state information dataset failing to satisfy a threshold; and
   generate an updated combined channel state information dataset that excludes the at least one channel state information dataset.

4. The computing system of claim 1, wherein the instructions, when executed by the computing device processor, further enables the computing system to:
   assign a first signal strength score to the first signal strength;
   assign a second signal strength score to the second signal strength; and
   determine a signal score strength difference is within a signal strength score range.

5. The computing system of claim 1, wherein the instructions, when executed by the computing device processor, further enables the computing system to:
   iteratively assign the combined channel state information dataset with a current timestamp and current signal strength score.

6. The computing system of claim 1, wherein the instructions, when executed by the computing device processor, further enables the computing system to:
   activate a third subset of antennas of the plurality of antennas based on the antenna configuration file, wherein activating the third subset of antennas deactivates the second subset of antennas;
   obtain a third RF signal by the third subset of antennas;
   analyze the third RF signal to generate a third channel state information dataset, a third timestamp, and a third signal strength;
   determine a time difference between a current timestamp and the third timestamp is within the period of time;

determine a signal strength difference between a current signal strength and the third signal strength is within the signal strength range;

combine the combined channel state information dataset and the third channel state information dataset to create an updated combined channel state information dataset; and determine an angle of arrival of the first RF signal, the second RF signal, and the third RF signal based on the updated combined channel state information dataset.

7. The computing system of claim 1, wherein the plurality of antennas are arranged in one of a linear antenna array layout, a two-dimensional antenna array layout, or a three-dimensional antenna multi-array layout.

8. The computing system of claim 1, wherein the neighboring antennas are not equidistant from each other; and the distance from neighboring antennas is less than half of a signal wavelength.

9. The computing system of claim 1, wherein a subset of antennas is activated by one of a single pole four throw (SP4T) RF switch, single pole double throw (SPDT) RF switch, single pole three throw (SP3T) RF switch, and single pole six throw (SP6T) RF switch.

10. The computing system of claim 1, wherein the antenna configuration file includes a schedule of antenna subset selection.

11. An apparatus for receiving radio frequency (RF) signals, comprising:
an antenna array comprising a plurality of antennas, individual antennas positioned a distance from neighboring antennas;
a computing device processor; and
a memory device including instructions that, when executed by the computing device processor, enables the apparatus to:
detect a client device;
obtain a response to a control message from the client device within a time interval;
establish a communication session between the computing device processor and the client device;
obtain an antenna configuration file, the antenna configuration file operable to control a selection of at least one antenna of the plurality of antennas;
activate a first subset of antennas of the plurality of antennas based on the antenna configuration file;
obtain a first RF signal by the first subset of antennas;
analyze the first RF signal to generate a first channel state information dataset, a first timestamp, and a first signal strength;
activate a second subset of antennas of the plurality of antennas based on the antenna configuration file, wherein activating the second subset of antennas deactivates the first subset of antennas;
obtain a second RF signal by the second subset of antennas;
analyze the second RF signal to generate a second channel state information dataset, a second timestamp, and a second signal strength;
determine a time difference between the first timestamp and the second timestamp is within a period of time;
determine a signal strength difference between the first signal strength and the second signal strength is within a signal strength range;
combine the first channel state information dataset and the second channel state information dataset to create a combined channel state information dataset; and determine an angle of arrival of the first RF signal and the second RF signal based on the combined channel state information dataset.

12. The apparatus of claim 11, wherein the control message is one of an 802.11 control message and 802.11 null data frame; and
the client device is capable of receiving and transmitting 802.11 messages within the time interval.

13. The apparatus of claim 11, wherein the instructions, when executed by the computing device processor, further enables the apparatus to:
for a plurality of channel state information datasets, identify at least one channel state information dataset failing to satisfy a threshold; and
generate an updated combined channel state information dataset that excludes the at least one channel state information dataset.

14. The apparatus of claim 11, wherein the instructions, when executed by the computing device processor, further enables the apparatus to:
assign a first signal strength score to the first signal strength;
assign a second signal strength score to the second signal strength; and
determine a signal score strength difference is within a signal strength score range.

15. The apparatus of claim 11, wherein the instructions, when executed by the computing device processor, further enables the apparatus to:
iteratively assign the combined channel state information dataset with a current timestamp and a current signal strength score.

16. The apparatus of claim 11, wherein the instructions, when executed by the computing device processor, further enables the apparatus to:
activate a third subset of antennas of the plurality of antennas based on the antenna configuration file, wherein activating the third subset of antennas deactivates the second subset of antennas;
obtain a third RF signal by the third subset of antennas;
analyze the third RF signal to generate a third channel state information dataset, a third timestamp, and a third signal strength;
determine a time difference between a current timestamp and the third timestamp is within the period of time;
determine a signal strength difference between a current signal strength and the third signal strength is within the signal strength range;
combine the combined channel state information dataset and the third channel state information dataset to create an updated combined channel state information dataset; and
determine an angle of arrival of the first RF signal, the second RF signal, and the third RF signal based on the updated combined channel state information dataset.

17. The apparatus of claim 11, wherein the plurality of antennas are arranged in one of a linear antenna array layout, a two-dimensional antenna array layout, or a three-dimensional antenna multi-array layout.

18. A non-transitory computer readable storage medium storing instructions that, when executed by at least one processor of a computing system, causes the computing system to:
detect a client device;
obtain a response to a control message from the client device within a time interval;

establish a communication session between a network anchor device and the client device;

obtain an antenna configuration file, the antenna configuration file operable to control a selection of at least one antenna of a plurality of antennas, individual antennas positioned at a known distance from neighboring antennas;

activate a first subset of antennas of the plurality of antennas based on the antenna configuration file;

obtain a first radio frequency (RF) signal by the first subset of antennas;

analyze the first RF signal to generate a first channel state information dataset, a first timestamp, and a first signal strength;

activate a second subset of antennas of the plurality of antennas based on the antenna configuration file, wherein activating the second subset of antennas deactivates the first subset of antennas;

obtain a second RF signal by the second subset of antennas;

analyze the second RF signal to generate a second channel state information dataset, a second timestamp, and a second signal strength;

determine a time difference between the first timestamp and the second timestamp is within a period of time;

determine a signal strength difference between the first signal strength and the second signal strength is within a signal strength range;

combine the first channel state information dataset and the second channel state information dataset to create a combined channel state information dataset; and determine an angle of arrival of the first RF signal and the second RF signal based on the combined channel state information dataset.

19. The non-transitory computer readable storage medium of claim 18, wherein the instructions, when executed by the at least one processor, further enables the computing system to:

iteratively assign the combined channel state information dataset with a current timestamp and current signal strength score.

20. The non-transitory computer readable storage medium of claim 18, wherein the instructions, when executed by the at least one processor, further enables the computing system to:

activate a third subset of antennas of the plurality of antennas based on the antenna configuration file, wherein activating the third subset of antennas deactivates the second subset of antennas;

obtain a third RF signal by the third subset of antennas;

analyze the third RF signal to generate a third channel state information dataset, a third timestamp, and a third signal strength;

determine a time difference between a current timestamp and the third timestamp is within the period of time;

determine a signal strength difference between a current signal strength and the third signal strength is within the signal strength range;

combine the combined channel state information dataset and the third channel state information dataset to create an updated combined channel state information dataset; and determine an angle of arrival of the first RF signal, the second RF signal, and the third RF signal based on the updated combined channel state information dataset.

* * * * *